United States Patent [19]
Loose

[11] 3,893,482
[45] July 8, 1975

[54] LOW NOISE FAUCET

[75] Inventor: Bernd Loose, Krov, Mosel, Germany

[73] Assignee: American Standard Inc., New York, N.Y.

[22] Filed: Nov. 5, 1974

[21] Appl. No.: 521,129

[30] Foreign Application Priority Data
Nov. 10, 1973  Germany............................ 2356326

[52] U.S. Cl. .......................... 137/625.17; 137/636.4
[51] Int. Cl.² ......................................... F16K 11/00
[58] Field of Search ..... 137/625.4, 550, 544, 454.6, 137/625.17, 636.4, 545, 802; 251/127, 369, 118

[56] References Cited
UNITED STATES PATENTS

| | | | |
|---|---|---|---|
| 2,880,752 | 4/1959 | Kreuttner..................... | 137/625.4 X |
| 3,262,468 | 7/1966 | Metzger............................. | 137/802 |
| 3,347,268 | 10/1967 | Muller et al. .................. | 137/625.17 |
| 3,433,264 | 3/1969 | Parkison......................... | 251/127 X |
| 3,533,444 | 10/1970 | Lyon............................... | 137/625.17 |

*Primary Examiner*—Martin P. Schwadron
*Assistant Examiner*—Robert J. Miller
*Attorney, Agent, or Firm*—Robert G. Crooks; James J. Salerno, Jr.

[57] ABSTRACT

An improved water faucet having a valve body with control elements formed by two discs wherein the first disc is stationary and has water inlet openings and an outlet opening, connected on one side to the valve manifold. The other side is directed toward the second disc, which is movably arranged on the first disc. The second disc has a surface cavity overlapping the inlet openings and outlet opening of the first disc. Noise-reducing assembly including a plurality of overlapping screens, the wire orientation of each screen being angularly offset with respect to that of the other screens, the assembly being disposed within the surface cavity of the second disc with the wire screens spaced from the ceiling thereof to form a chamber which aids in reducing the cavitation noise of the valve.

10 Claims, 5 Drawing Figures

PATENTED JUL 8 1975 3,893,482

SHEET 1

LOW NOISE FAUCET

CROSS REFERENCE TO RELATED APPLICATION

This application is being filed contemporaneously with U.S. Pat. application Ser. No. 513,209, of A. Fowell entitled LOW NOISE FAUCET.

BACKGROUND OF THE INVENTION

This invention relates to mixing faucets and particularly the present invention represents improvements of the faucet and valve disclosed in U.S. Pat. Nos. 3,433,264 and 3,533,436.

In recent years, mixing faucets have to a large extent replaced the separate hot and cold water faucets which are used on sinks, lavatories, bathtubs and showers. In mixing faucets, hot and cold water have been mixed to the desired ratio and delivered to the sink or lavatory from a single spout at the desired temperature with the desired rate of flow. These faucets are usually provided with a single handle or lever which can be used to control both the desired rate of flow and the desired temperature of the water. In using mmxing valves, the control handle is designed so that the for-and-aft direction controls the rate of flow, and the side-to-side motion of the handle controls the temperature of the water. In traditional types of faucets, the lever is arranged so that a movement to the left causes hot water to flow while a movement to the right causes cold water to flow.

Mixing faucets are generally designed to incorporate a mixing valve and may be in the form of a cartridge so that it may be removably attached to the manifold of the faucet housing within the decorative structure. Valve cartridges of this type include inlet openings for the entry of hot and cold water from the manifold of the faucet housing, and an outlet opening through which the desired mixture of water may be returned from the valve cartridge to the faucet for discharge through a spout into the sink, lavatory, bathtub or shower. A stationary valve-seat disc is provided within the cartridge and includes ports corresponding to the openings in the manifold. A movable valve-plate disc is also provided and arranged for slidable, sealing contact with the valve seat disc. The valve plate disc includes either a cavity in its surface adjacent to the valve seat disc, or ports therethrough which can be disposed to cooperate with corresponding ports in the valve seat disc to admit water from the hot and cold water lines for mixing purposes.

The movable valve-plate disc is coupled to the control lever of the mixing faucet. The valve-seat and plate discs are preferably constructed of a very hard ceramic material such as aluminum oxide, and their mating surfaces are polished extremely smooth and flat. These materials do not deteriorate appreciably with time, and are so hard that very little wear takes place even between their cooperating surfaces.

One of the problems of mixing faucets of this type has been their noisiness of operation due to cavitation occuring within the valve seat and plate discs. In order to reduce the noise problem, the cavity formed within the valve plate disc was provided with a series of ridges or terraces which were designed to break up, divide, and distribute the cavitation bubbles which are formed.

Although, these design improvements of the prior art managed to reduce noise level caused by cavitation, the noise level still is objectionable under certain plumbing codes. The cavitation noise produced within the valve plate disc and transmitted through the valve body and the feed pipes of the faucet was still found to be objectionable. In another embodiment of the prior art, a single screen was added across the ceiling of the cavity of the valve plate disc to further break up the cavitation bubbles responsible for the noise during the operation of the faucet. Difficulties were encountered for permanently mounting the screen within the cavity of the ceramic disc. Any dislodgment of the screen could damage the valve components and would affect the performance of the faucet particularly with regard to the reduction of noise provided by the screen. However, although the resultant noise was reduced it was still found to be objectionable under certain plumbingcode standards.

SUMMARY OF THE INVENTION

Accordingly, it is an object of the present invention to provide a faucet which is capable of reducing the noise level below that of faucets of the prior art during operation.

It is another object of the present invention to provide a faucet having improved mounting means for affixing the noise reducing screens within the valve body.

It is a further object of the present invention to provide a faucet which is capable of quiet operation to meet a larger number of plumbing code standards.

Still another object of the present invention is to provide a low-noise faucet having a plurality of overlapping screens, the wire orientation of each screen being angularly offset with respect to that of the other screens and the screens being positioned a predetermined distance from the ceiling of the cavity of the movable disc.

It is a further object of the invention to provide a noise reducing assembly as a composite unit with means for mounting the screens within the cavity of the movable disc of a faucet so that the assembly is accurately positioned and retained therein and will not be dislodged therefrom.

It is a further object according to the present invention to provide an improved water faucet which is quieter and reliable in operation, simple in design, easy to construct and to manufacture.

Briefly, the objects of the invention are fulfilled by providing a composite noise reducing assembly arranged and constructed for mounting in a water faucet having a valve body with control elements formed by two discs. The first disc is fixed or stationary and is formed with water inlet openings and and water outlet opening connected on one side to a valve manifold and on the other side directed towards the second disc which is movably arranged on the first disc. The second disc is provided with a surface cavity which can simultaneously overlap the inlet openings and the outlet opening formed in the first disc. This noise reducing assembly is mounted within said surface cavity of the second disc and is spaced a predetermined distance from the ceiling of the cavity to define a noise isolating space within the cavity. The assembly includes a plurality of over-lapping screens the wire orientation of each screen being angularly offset with respect to that of the other screen.

The mounting of the offset and overlapping wire screens within the cavity of the second or movable disc provides a perforated surface to break up the cavitation bubbles and a surface on which the bubbles may implode. The wire screens also reduces noise that may be transmitted to the discs of the cartridge. In some instances, the space formed between the screen and the ceiling of the cavity may fill with air to provide an additional cushion against noise being transmitted to the disc.

Other objects and features of the present invention will become apparent from the following detailed description considered in connection with the accompanying drawings which disclose the embodiments of the invention. It is to be understood, however, that the drawing is designed for the purpose of illustration only and not as a definition of the limits of the invention as to which reference should be made to the appended claims.

BRIEF DESCRIPTION OF THE DRAWINGS

In the drawings wherein similar reference characters denote similar elements throughout the several views.

DESCRIPTION OF PREFERRED EMBODIMENTS

Figures 1, 2:
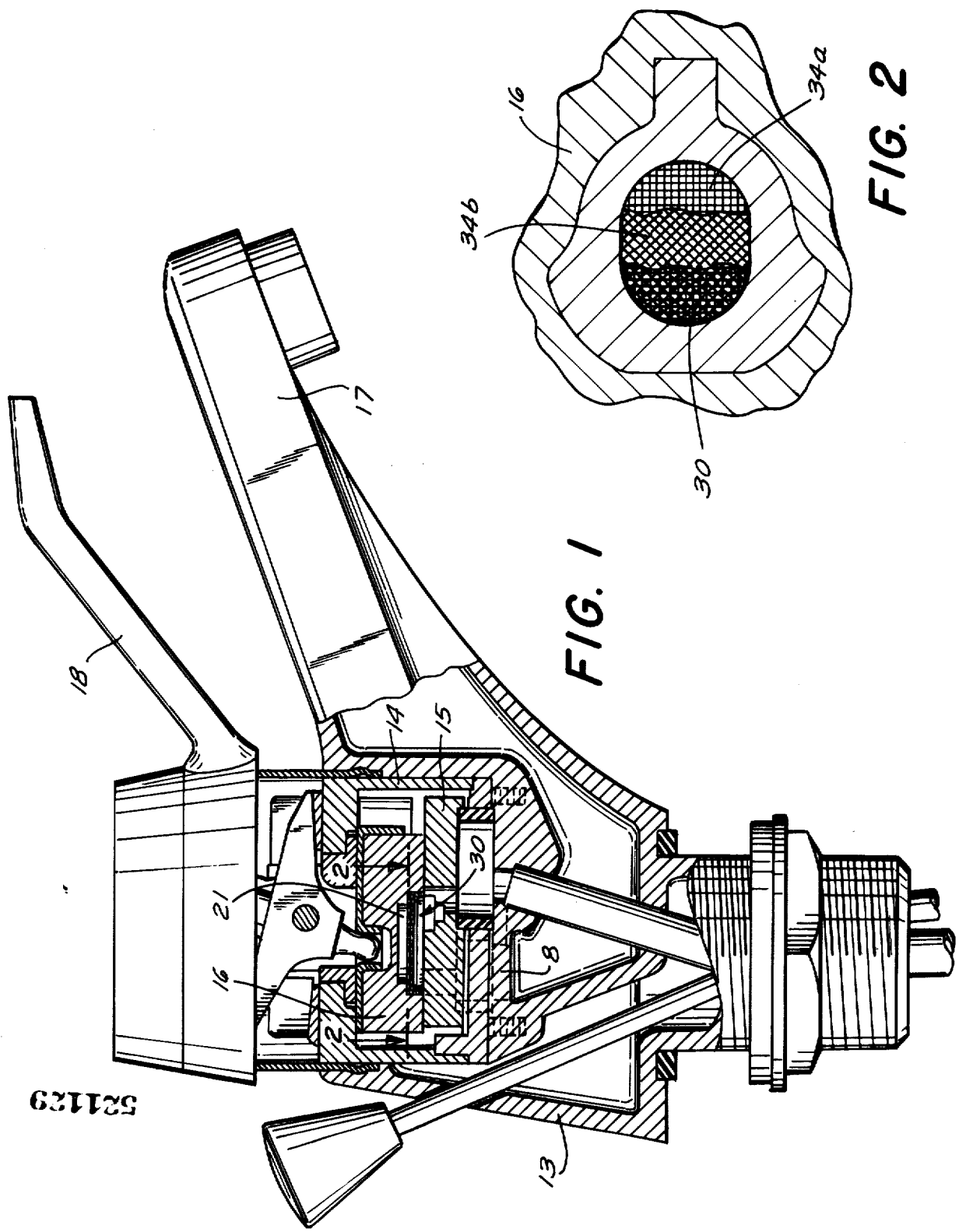
FIG. 1 illustrates a water faucet in the form of a mixing valve partly in longitudinal section including noise reducing means disposed in the movable disc.
FIG. 2 is a cross-sectional view taken along section 2—2 of FIG. 1 in which the noise reducing assembly is shown broken away to illustrate overlapping screens, the wire orientation of each screen being angularly offset with respect to that of the other screen when mounted in the cavity of the movable disc.

FIG. 1 is a side view partly in cross-section of a water faucet similar to that disclosed in U.S. Pat. Nos. 3,433,264 and 3,533,436. The faucet body 13 which mounts and houses the mixing valve in the form of a casing or cartridge 14 includes control elements formed by two discs 15 and 16. Disc 15 and 16 may be made of any suitable materials which can be formed having smooth relatively hard surfaces such as ceramic, molded plastic, metals or the like. Disc 15 is mounted in fixed position in cartridge 14 and has two inlet openings, not shown, for hot and cold water as well as an outlet opening 8 shown in broken line leading to outlet 17 for discharging the mixed water. Disc 16 is movable on disc 15 so that it can slide or swivel by lever control means 18. Disc 16 is formed having a surface cavity 21 and is in fluid communication with the inlet openings and the indicated outlet opening of lower disc 1t. Noise reducing assembly 30 is shown mounted in cavity 21 so that when water is conducted through the inlet openings the noise level of the water is substantially reduced as it passes through cavity 21 through outlet opening 8.

Figure 3:
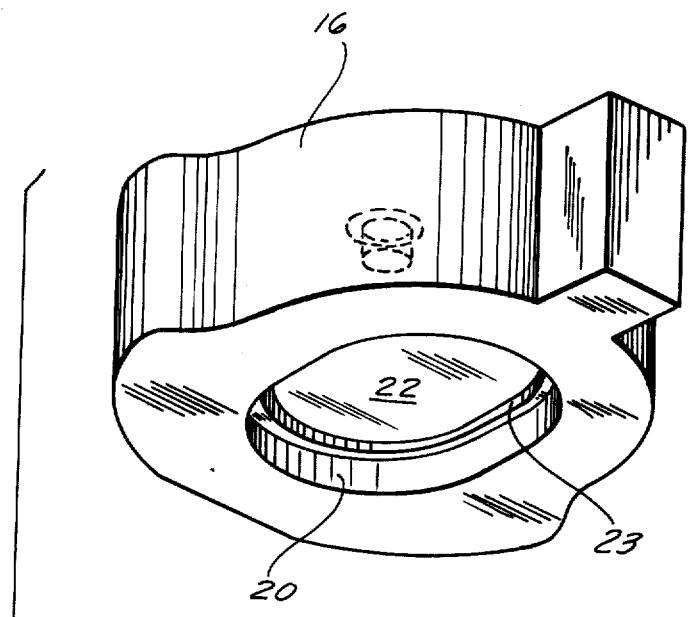
FIG. 3 is an exploded view of the movable disc and the composite noise reducing assembly as it would be mounted within the cavity of the disc.

In FIG. 3, there is illustrated an exploded view disc 16 and noise reducing assembly 30. Noise reducing assembly 30 includes a pair of overlapping screens 34a and 34b with the wire orientation of each screen being angularly offset with respect to of the other. Screens 34a and 34b may be rotated about the vertical axis of the assembly up to about 45°. It has been found that where screens 34a and 34b have been rotated that a substantial reduction in noise due to cavitation produced while water is flowing through cavity 21 in disc 16 is achieved. Noise reduction below 30 decibels and as low as about 16 decibels are achieved when the wire orientation of the screens are angularly offset, that is where the angle of rotation is up to 45° as shown in FIG. 3.

Noise reducing assembly 30 is positioned in cavity 21 on step or terrace 23. Step 23 is of predetermined height and is formed at the juncture of ceiling 22 and wall 20 to provide the required spacing for noise reducing assembly 30 from ceiling 22 to optimize the reduction of noise produced by water being conducted through cavity 21. Also the distance between screens 34a and 34b and ceiling 22 defines the chamber which aids in reducing the cavitation noise during the operation of the valve.

As noted above in some instances the chamber will fill with air to provide an additional cushion against noise being transmitted to the disc thereby reducing the noise due to cavitation. Noise reducing assembly 30 illustrated in FIG. 3 is preferably assembled by coupling screens 34a and 34b together as by spot welding so that the wire orientation of each screen is angularly offset with respect to that of the other and that the respective openings are angularly offset by about 45° with respect to the long axis of cavity 21 and is so illustrated in FIGS. 2 and 3. Screens 34a and 34b are then mounted in fixed position on retaining ring 38 as by spot welding. Assembly 30 is then inserted into cavity 21 so that screen 34a nests on step 23 with the open end of retaining ring 38 being flush with the surface 24 of disc 16 or slightly recessed in cavity 21. Noise reducing assembly 30 is illustrated mounted in cavity 21 in FIG. 4 as described above.

Figure 5:
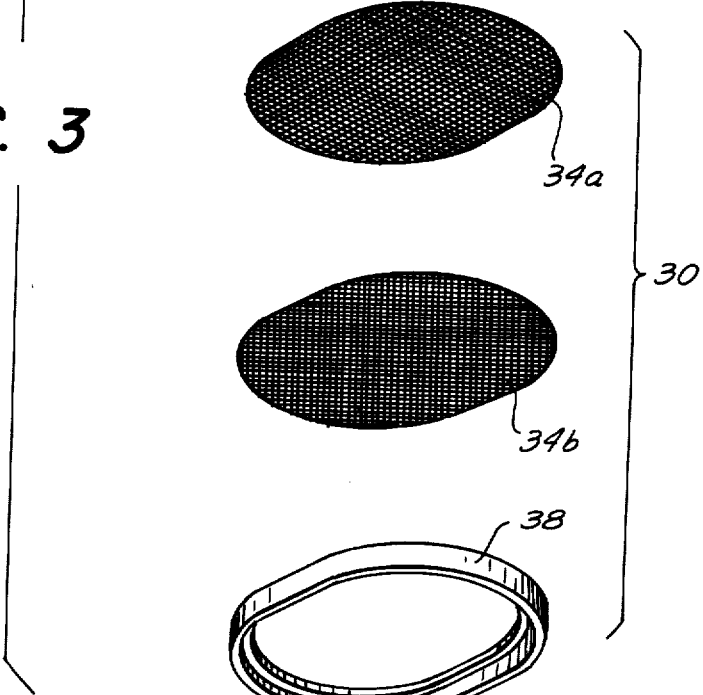
FIG. 5 is an enlarged fragmentary, sectional elevational view of an alternative form of the overlapping screens of FIG. 3.
Figure 5:
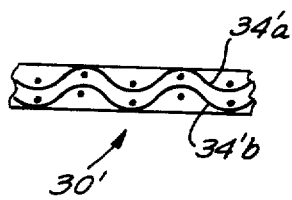
Figure 4:
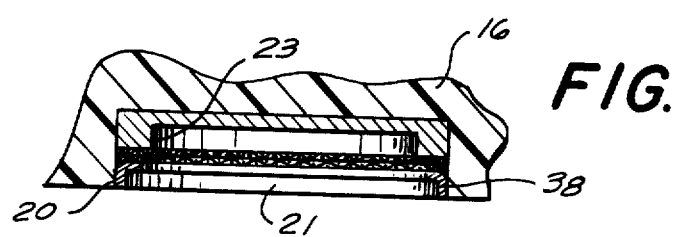
FIG. 4 is a sectional elevational view of FIG. 3 fully assembled.

In FIG. 5 noise assembly 30' is illustrated mounted in cavity 21 in similar fashion as illustrated in FIG. 4. However, screens 34'a and 34'b are assembled in overlapping relationship and with the wire orientation of each screen being angularly offset with respect to that of the other and are coupled together by calendering procedures in which the screens are mated by pressure alone. Thereafter the screens are spot welded to retaining ring 38 as described above.

Noise reducing assembly 30 and 30' as illustrated in FIGS. 3 and 5 are preferably constructed of stainless steel while having a diameter of about 0.13mm and formed in a 0.76 × 0.76mm mesh. The height of retaining ring 38 is about 2.2mm which permits sufficient flow of water through the faucet of the type illustrated in FIG. 1. Where a water faucet, such as shown in FIG. 1, has a movable disc 16 with a thickness of about 12.7mm, a cavity 21 of about 5.8mm in depth, a length of about 17mm and width of about 13mm, and noise reducing screens 34a and 34b spaced from the ceiling 22 about 3.6mm provides optimum noise reduction for such a faucet. Where a water faucet having different dimensions as noted above for the removal disc then the space formed between the ceiling of the cavity and the noise reducing assembly would also change.

While several embodiments of the present invention have been illustrated and described it is obvious to those skilled in the art that many changes and modifications may be made thereto without departing from the end scope of the invention.

What is claimed:

1. In a water faucet having a valve body with control elements formed by two discs, the first disc being stationary and having water inlet openings and water outlet opening connected on one side to a valve manifold and on the other side directed towards the second disc which is movably arranged on the first disc, the second disc having a surface cavity arranged and constructed to overlap the inlet openings and the outlet opening formed in the first disc, the improvement comprising:

noise reducing assembly disposed within the surface cavity of the second disc and including a plurality of overlapping screens, the wire orientation of each screen being angularly offset with respect to that of the other screens;

said noise reducing assembly being spaced a predetermined distance from the ceiling of said cavity defining a noise-isolating chamber within the cavity.

2. The water faucet according to claim 1 wherein said noise-reducing assembly includes a pair of overlapping metal screens positioned within said cavity to provide a perforated surface for cavitation bubbles to implode thereon.

3. The water faucet according to claim 2 wherein said screens are coupled together by at least one spot weld.

4. The water faucet according to claim 2 wherein said screens are coupled together by calendering.

5. The water faucet as recited in claim 1 wherein said overlapping metal screens are mounted in fixed position on a retaining ring, said retaining ring being of a size to provide a pressure fit to position said screen in said cavity.

6. A noise reducing assembly arranged and constructed for mounting in a water faucet having a valve body with control elements formed by two discs, the first disc being stationary and having water inlet openings and water outlet opening connected on one side to a valve manifold and on the other side directed towards the second disc which is movably arranged on the first disc, the second disc having a surface cavity adapted to be in fluid communication with the inlet openings and the outlet opening formed in the first disc, said noise reducing assembly comprising:

noise reducing assembly disposed within the surface cavity of the second disc and including a plurality of overlapping screens, the wire orientation of each screen being angularly offset with respect to that of the other screens;

said noise reducing assembly being spaced a predetermined distance from the ceiling of said cavity defining a noise-isolating chamber within the cavity.

7. The noise reducing assembly according to claim 6 wherein said screen means includes a pair of overlapping metal screens positioned within said cavity to provide a perforated surface for cavitation bubbles to implode thereon.

8. The noise reducing assembly according to claim 6 wherein said screens are coupled together by at least one spot weld.

9. The noise reducing assembly according to claim 7 wherein said screens are coupled together by calendering.

10. The noise reducing assembly according to claim 6 wherein said overlapping metal screens are mounted in fixed position on a retaining ring, said retaining ring being of a size to provide a pressure fit to position said screen in said cavity.

* * * * *